No. 791,607. PATENTED JUNE 6, 1905.
J. E. BRIGGS.
LENS MEASURE.
APPLICATION FILED OCT. 11, 1904.

Witnesses
E. F. Stewart
H. T. Hubard

James E. Briggs,
Inventor
by C. A. Snow & Co.
Attorneys

No. 791,607.

Patented June 6, 1905.

UNITED STATES PATENT OFFICE.

JAMES E. BRIGGS, OF ROCHESTER, NEW YORK.

LENS-MEASURE.

SPECIFICATION forming part of Letters Patent No. 791,607, dated June 6, 1905.

Application filed October 11, 1904. Serial No. 228,073.

*To all whom it may concern:*

Be it known that I, JAMES E. BRIGGS, a citizen of the United States, residing at Rochester, in the county of Monroe and State of New York, have invented a new and useful Lens-Measure, of which the following is a specification.

This invention relates to measuring instruments, and has for its object to provide a simple and improved instrument of this class for measuring concavities and convexities and is particularly adapted for measuring the concavity and convexity of lenses for glasses, spectacles, and the like in accordance with the dioptric system employed by opticians for indicating the refractory strength of lenses.

It is furthermore designed to embody the invention in a pocket instrument, so that it may be carried upon a person in position for convenient use, and also to arrange the device in compact form capable of convenient manipulation and application to lenses when measuring the same.

Another object of the invention is to produce the device in such form as to be capable of receiving advertising matter in order that the device may also operate as an advertising medium, and, furthermore, to have the device serve as an ordinary straight-edge and measure.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
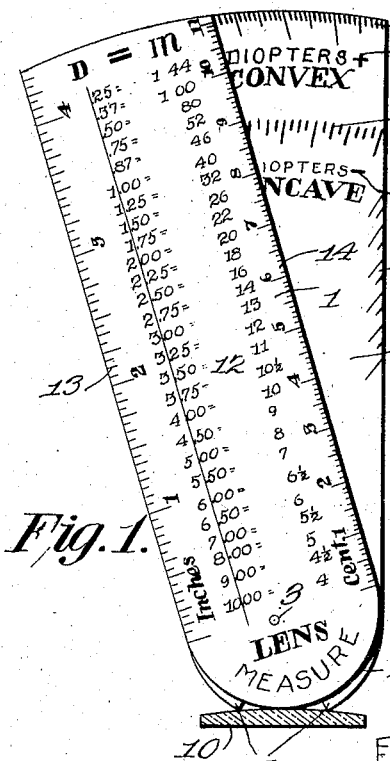
Figure 2:
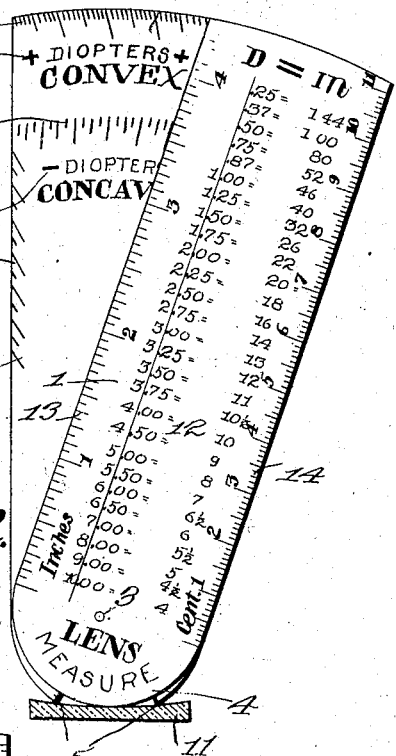
Figure 3:
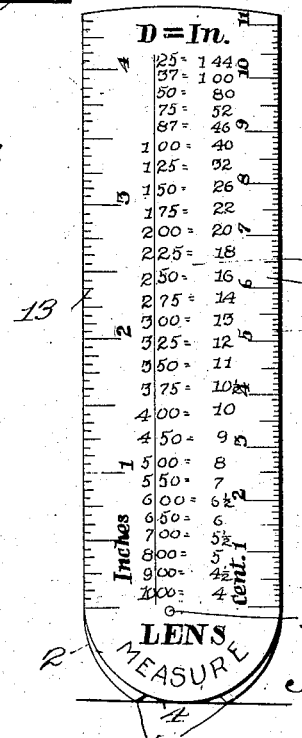

In the accompanying drawings, Figure 1 is an elevation of the measuring device of the present invention applied to measure a convex lens, the lens being shown in section. Fig. 2 is a similar view showing the device applied to a concave lens. Fig. 3 is a view showing the instrument collapsed in position for carrying in a pocket of the clothing and serving as an ordinary straight-edge and measure.

Like characters of reference designate corresponding parts in each and every figure of the drawings.

The present instrument includes two members, (designated 1 and 2, respectively,) which are in the nature of straight flat arms of corresponding measurements, so as to exactly register when placed face to face in their normal inoperative conditions. These arms or members are formed of suitable material—such, for instance, as metal, wood, celluloid, or the like—so as to be strong and durable and at the same time light in weight to facilitate the manipulation of the device and to permit of the instrument being carried with comfort in a pocket of the clothing. Adjacent one end of the instrument the arms are connected by a pivot 3, which pierces the members at one side of the longitudinal center of the instrument, so as to form an eccentric connection for the members, which may be swung past one another in parallel planes, so as to expose the inner faces of the members when separated upon their eccentric connection. The front member or arm has its inner end rounded, as at 4, upon an arc struck from the longitudinal center thereof, while the pivotal end of the rear or back member 2 is provided with a pair of projections 5, disposed at opposite sides of and equidistant from the longitudinal center of the member and projected at a suitable distance to have their outer extremities lie in the same straight line with the outermost portion of the convex end 4 of the arm 2, as will be understood by reference to Fig. 3 of the drawings, wherein it will be seen that the projections or rests 5 and the convex end 4 of the arm 1 will rest upon a straight flat or level surface when the arms are registered or have their longitudinal edges in parallelism.

Upon the inner face of the rear member 2 there is a scale 6, extending transversely across the member near its outer end and marked "Diopters convex," with the plus-sign 7 at opposite ends of the word "diopters," and graduated in accordance with the dioptric system, the scale-marks being set at an inclination to register with one longitudinal edge of the member 1—as, for instance, the right-hand edge thereof, as shown in Fig. 1 of the accompanying drawings. Below the scale 6 is another scale, 8, marked "Diopters concave," and provided at opposite ends of word "diopters" with a minus-sign 9, the marks of this scale being inclined reversely with respect to the marks of the scale 6 and arranged to register with the other longitudinal edge of the arm 1 when the latter is moved in the opposite direction. It will here be noted that the arm or member 2 serves as a scale, while the arm 1 constitutes a pointer or index to coöperate with the scales of the scale member. If desired, and as shown in the drawings, the word "diopters" may be applied to the scale member 2 adjacent the scales thereof to indicate the character of said scales. The scale 6 may be extended along the left-hand edge of the scale member 2, as at $6^a$, and the other scale, 8, may be extended along the right-hand edge of the scale member, as at $8^a$, in the manner illustrated in the drawings, as will be readily understood.

In using the device to measure a convex surface, as shown in Fig. 1 of the drawings, the rests or points 5 are placed upon the convex face of the lens 10 and the index member 1 turned to the left until its convex end and the rests 5 rest evenly upon the convex surface, and upon reference to the graduation of the convex scale 6, with which the right-hand longitudinal edge of the index member registers, the dioptric measurement of the lens can be determined. To measure a concave lens, as shown in Fig. 2, the rests 5 are applied to the concave side of the lens 11 and the index-arm swung to the right of the scale-arm until its convex end and the rests 5 evenly engage the concave surface, whereupon the dioptric measure of the lens will be indicated upon the scale 8 at the point where the left-hand longitudinal edge of the index member 1 crosses the scale.

For the purpose of ready reference a comparative scale 12, giving different measurements in diopters opposite the respective focal distances expressed in inches, is provided upon the front face of the index member 1, and the opposite longitudinal edges of the latter are provided with the respective scales 13 and 14, the scale 13 being expressed in inches and the scale 14 in centimeters and millimeters.

From the foregoing description it is apparent that the present invention produces a flat compact instrument free from external projections and especially adapted for carrying in a pocket of the clothing, and in addition to the mechanical construction and arrangement of parts it is proposed to employ suitable advertising matter upon the rear faces of the scale and index members in order that the device may serve as an advertising medium as well as a measuring instrument. Furthermore, the device comprises but two members, which may be conveniently manipulated to measure a lens and indicate the dioptric convexity or concavity thereof, and when the device is collapsed or folded into its normal inoperative condition it serves as an ordinary straight-edge or rule either for measuring or for drawing a straight line.

Having fully described the invention, what is claimed is—

1. A device of the class described comprising a scale member and an index member coöperating therewith, said members having parallel registered longitudinal edges in the normal inoperative position of the device and having a terminal eccentric pivotal connection, the pivotal end of the scale member having a pair of rest projections at opposite sides of its longitudinal center and equidistant therefrom and the index member having its pivotal end convex, and the inner face of the scale member being provided with a convex dioptric scale disposed transversely thereof for coöperation with one longitudinal edge of the index member and also provided with a transversely-disposed concave dioptric scale for coöperation with the other longitudinal edge of the index member.

2. A device of the class described comprising a scale member and an index member coöperating therewith, said members having parallel registered longitudinal edges in the normal inoperative position of the device and having a terminal eccentric pivotal connection, the pivotal end of the scale member having a pair of rest projections at opposite sides of and equidistant from its longitudinal center and the index member having its pivotal end convex, and the inner face of the scale member being provided with a convex dioptric scale disposed transversely thereof for coöperation with one longitudinal edge of the index member and also provided with a transversely-disposed concave dioptric scale for coöperation with the other longitudinal edge of the index member, one of the scales being extended along one of the longitudinal edges of the scale member and the other scale extended along the opposite longitudinal edge of said scale member.

3. A device of the class described comprising a scale member and an index member coöperating therewith, said members having parallel registered longitudinal edges in the normal inoperative position of the device and having a terminal eccentric pivotal connection, the pivotal end of the scale member having a pair of rest projections at opposite sides of and equidistant from its longitudinal center and the index member having its pivotal end convex, and the inner face of the scale member being provided with a convex dioptric scale disposed transversely thereof for coöperation with one longitudinal edge of the index member and also provided with a transversely-disposed concave dioptric scale for coöperation with the other longitudinal edge of the index member, the front face of the index member being provided at each longitudinal edge with a linear scale.

In testimony that I claim the foregoing as my own I have hereto affixed my signature in the presence of two witnesses.

JAMES E. BRIGGS.

Witnesses:
A. TOMPKINS,
E. J. HUTCHISON.